United States Patent [19]

Faig et al.

[11] Patent Number: 4,988,273
[45] Date of Patent: Jan. 29, 1991

[54] INJECTION MOLDING MACHINES HAVING A BRUSHLESS DC DRIVE SYSTEM

[75] Inventors: Harold J. Faig, Cincinnati; Ronald M. Sparer, Madeira, both of Ohio

[73] Assignee: Cincinnati Milacron Inc., Cincinnati, Ohio

[21] Appl. No.: 370,669

[22] Filed: Jun. 23, 1989

[51] Int. Cl.$^5$ ............................................. B29C 45/77
[52] U.S. Cl. .................... 425/145; 264/40.3; 264/40.5; 264/40.7; 318/138; 318/254; 425/149; 425/150; 425/589
[58] Field of Search ............... 425/145, 149, 150, 169, 425/170, 171, 135, 589; 264/40.5, 40.7, 40.3; 318/138, 254

[56] References Cited

U.S. PATENT DOCUMENTS

| | | | |
|---|---|---|---|
| 2,035,801 | 3/1936 | Gastrow | 456/166 |
| 2,372,833 | 4/1945 | Jobst | 425/149 |
| 3,111,707 | 11/1963 | Buckley | 425/162 |
| 3,750,134 | 7/1973 | Weisend | 425/145 |
| 3,783,359 | 1/1974 | Malkiel | 318/254 |
| 4,540,359 | 9/1985 | Yamazaki | 425/135 |
| 4,546,293 | 10/1985 | Peterson et al. | 318/254 |
| 4,592,712 | 6/1986 | Gutjahr | 425/145 |
| 4,615,669 | 10/1986 | Fujita et al. | 425/147 |
| 4,692,674 | 9/1987 | Packard et al. | 318/254 |
| 4,695,237 | 9/1987 | Inaba | 425/171 |
| 4,741,685 | 5/1988 | Inaba et al. | 425/145 |
| 4,745,541 | 5/1988 | Vaniglia et al. | 364/162 |
| 4,755,123 | 7/1988 | Otake | 425/145 |
| 4,782,272 | 11/1988 | Buckley et al. | 318/254 |

OTHER PUBLICATIONS

Fanuc Autoshot T Series brochure.
Three Phase, Asynchronous Servo Drive Systems by Ludwig Gall, Sep. 3-10, '86.
Getting the Most from Expanding Motor Technology, A Comparison of AC and Brushless DC by Howard G. Murphy.
Design Consideration and Performance of Brushless Permanent Magnet Servo Motors by A. Weschta.
Computation Angle Control of a Brushless DC Motor by Gary L. Blank and James J. Wrobel.
Torque Production in Permanent-Magnet Synchronous Motor Drives with Rectangular Current Excitation by Thomas M. Jahns, 1984 IEEE.

Primary Examiner—Timothy Heitbrink
Attorney, Agent, or Firm—C. Richard Eby

[57] ABSTRACT

An injection molding machine utilizing brushless DC motors in its servomechanism drive systems. Brushless DC motors provide a cost effective high power drive system which has the simplicity of control of brush-type DC motors. By utilizing higher resolution encoders and controlling pressure with the servomotor velocity control loop, motor cogging and zero velocity oscillatiions are minimized.

9 Claims, 6 Drawing Sheets

INJECTION MOLDING MACHINES HAVING A BRUSHLESS DC DRIVE SYSTEM

FIELD OF THE INVENTION

The present invention relates to electric motor drives for injection molding machines and more particularly to the use of brushless DC electric motors in servomechanism drive systems for injection molding machines.

DESCRIPTION OF THE RELATED ART

Injection molding machines have traditionally been designed to use hydraulic systems as their primary source of motive power. Hydraulic devices have proven satisfactory over the years. They are relatively inexpensive, have power and velocity response characteristics compatible with the requirements of an injection molding machine and are rugged and reliable.

However, hydraulic systems do have several inherent disadvantages. The hydraulic oil is subject to dirt and contamination in an industrial environment and requires filtering and maintenance Further, there is the potential for oil leakage. The hydraulic drive has limited positioning accuracy and repeatability and changes in temperature of the hydraulic oil will lead to further variations in performance. Finally, the hydraulic drive is not energy efficient, and therefore, it requires heat exchangers and coolers to remove heat from the oil and maintain a constant oil temperature.

Electric motor servomechanism drives have been available for over forty years. The earlier systems utilized the well-known brush-type DC motor which has a number of coils wound on an armature terminating at a commutator. The armature is surrounded by a stator having a number of permanent or coil magnets corresponding to the number of windings on the armature. As the motor rotates, carbon brushes sequentially connect the armature coils to a power supply. The successive current flows through the coils create a magnetic field which reacts with the stator magnetic field to cause a torque on the armature, thereby continuing the rotational motion of the armature and the energization/commutation of the armature coils.

The most desirable characteristic of the brush-type DC motor is the simplicity of its control which is the result of several inherent motor characteristics. First, for any applied armature voltage, the maximum limits of speed and torque are established; and for a given operating condition, speed and torque will have an inverse linear relationship, i.e. as the motor load increases, the speed will linearly decrease. Second, torque is easily controlled because of its direct linear relationship with armature current. Finally, for maximum torque, the magnetic field created by the armature current flow must be in space quadrature with the poles of the stator magnetic field. The commutator construction of the armature automatically switches each armature coil at the right armature position to maintain the optimum space quadrature relationship. In spite of their simplicity and desirable performance characteristics, servomechanism drives utilizing the brush-type DC motors have the disadvantages of brush sparking, brush wear, brush maintenance and low speed torque ripple In addition having current conducting windings on the armature not only increases armature inertia, but it is difficult to dissipate heat from the armature which is separated from the stator and motor casing by an air gap.

Over the last twenty years, newer servomotor designs have been successful in approximating the inverse linear speed-torque characteristics of a DC motor without having to utilize the troublesome brushes. These newer designs represent several different motor technologies but they are often collectively referred to as brushless motors. Since they generally replicate brush-type DC motor performance, they are also sometimes overbroadly referred to collectively as brushless DC motors. However, upon closer examination, the brushless servomotor technology is more accurately separated into AC induction motors, AC synchronous motors, and brushless DC motors. Each of those motors has a unique physical construction, a unique control theory, and unique operating characteristics.

The application of AC induction motors in high performance servomechanism drives is the most recent development. The motor utilizes a short circuited squirrel-cage rotor and three phase windings on the stator. The control of such a motor in a servomechanism drive is very complex and costly, and a further analysis of that type of brushless motor is not required A variation on the induction motor construction is to replace the squirrel-cage rotor with a rotor containing permanent magnets. The motor is typically run in an open-loop synchronous mode. Without motor feedback, the control of its operation as a servomotor is not possible, and further discussion is not required.

Another category of brushless servomotors is the AC synchronous servomotor. This inside-out 3-phase motor design has a field generated by a permanent magnet, rotor utilizing rare-earth magnetic materials to maximize magnetic flux density and minimize weight. Therefore, the inertia of the rotor is reduced which optimizes the dynamic response of the motor. The stator has a number of sets of windings in each of its three phases, generally four, six, or eight, equal to the number of magnets in the rotor. Current flow in the three phase stator windings combine to produce a resultant magnetic field vector which interacts with the magnetic field of the rotor magnets to produce a torque. The magnitude of the magnetic vector and its angle relative to the magnetic moment of the rotor determines the magnitude and sense of the torque.

Figure 1A:
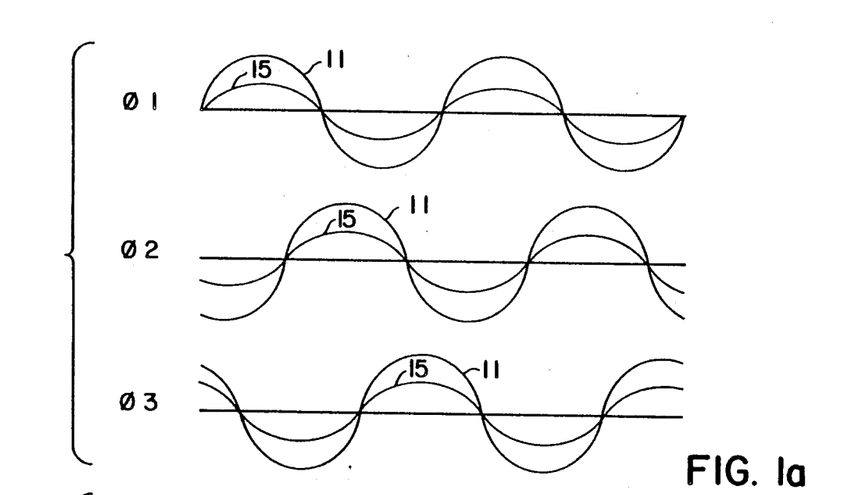
FIGS. 1a and 1b illustrate signals representing the induced EMF in the stator windings and the current signal applied to the stator windings for an AC synchronous servomotor and a brushless DC motor, respectively.

The geometry of the stator windings and the distribution of flux density of the permanent magnet rotor is such that a sinusoidal electro-motive force (EMF) 11 as shown in FIG. 1a is induced in the windings when the rotor is turned at a constant speed. The amplitude and frequency of the induced EMF are proportional with the speed. If the stator windings are supplied with 3-phase sinusoidal currents 15 of equal amplitude and frequency but shifted in phase by 120 degrees as shown in FIG. 1a, a rotating magnetic field will result at the stator poles. The strength of that magnetic field is proportional with the amplitude of the currents in the stator windings.

In order to achieve a maximum torque at a given current and an approximately direct linear torque-current, the relationship of the phase angle of each stator current and the angle of the magnetic vector produced by the rotor magnets must be held constant. Therefore, the phase relationship of the sinusoidal currents applied to the stator windings must be controlled and maintained in synchronous phase with the respective induced EMF's.

To accomplish the above functions, a feedback loop is closed between the motor and the motor control in order to obtain information regarding the motor operation. First, a feedback signal is required to determine the direction of shaft rotation Second, a feedback signal is required which defines the instantaneous absolute position of the rotor shaft so that the amplitude and phase of the current signals may be properly controlled. Finally, a feedback signal is required to measure motor speed which is necessary for velocity control. In most AC synchronous servomotors, all three feedback signals are derived from an absolute high resolution pulse encoder or a resolver having an incremental resolution typically in the range of 2000-4000 pulses per revolution.

As will be subsequently discussed in more detail, AC servomotors require a very complex control for electronically commutating the stator currents and digitally creating the sinusoidal current wave forms for each phase. Clearly, the AC synchronous servomotor control is vastly more complicated than that used with a brush-type DC motor.

Over the last several years, some injection molding machines have been introduced using AC synchronous servomotors. Such devices are designed as high performance servomechanism drives and have gained favor as motive power systems in machine tools, industrial robots and other applications. To obtain superior servo performance, the design of AC synchronous motors has evolved to maximize the motor's response time and positioning resolution and accuracy. For example, exotic magnetic materials are used in the motor rotor to reduce weight and inertia. Further, motor construction is relatively sophisticated, and motor controls have been developed to provide the complex commutation necessary to achieve higher positioning resolution and accuracy. The end result is that high performance is achievable but more complex controls are required with a higher cost.

Further, the smaller compact designs of AC synchronous motors which are required for high servo performance have resulted in motors having limited power output. Consequently, in applications where more power is required a plurality of motors must be ganged together into a single motive power system.

SUMMARY OF THE INVENTION

Applicants desire to have the benefits of electric motor drives on an injection molding machine, but they wish to avoid the control complexity, higher cost and inherent power limitations of available AC synchronous motors.

In contrast to AC synchronous motors, brushless DC motors are not used as high performance servomechanism drives because they experience cogging or torque pulsations at lower speeds and generally their positioning accuracy and repeatability are less than that of AC servomotors. However, applicants have discovered that by minimizing the torque pulsations, DC brushless motors can effectively be used as servomechanism drives on an injection molding machine.

An object and advantage of this invention is to provide an injection molding machine having brushless DC motor drives that are rugged, are of simple construction and include reliable motor controls which can be obtained at minimum cost.

A related object and advantage of the invention is to provide brushless DC motor drives for a full range of injection molding machine sizes including those capable of 1000 tons or more of clamping force without having to gang together two or more motors in a single drive unit to provide the necessary power.

A further object and advantage of this invention is to provide an injection molding machine having brushless DC motor drives which provide performance equal to or better than the performance requirements of current state of the art injection molding machines.

A still further object and advantage of this invention is to provide an injection molding machine having brushless DC motor drives for the clamp unit, the extruder and injection unit, as well as the other closed loop motive power systems typically used on an injection molding machine.

The nature, principle and utility of the invention will become more apparent from the following detailed description when read in conjunction with the accompanying drawings.

DESCRIPTION OF THE PREFERRED EMBODIMENT

Figure 1B:
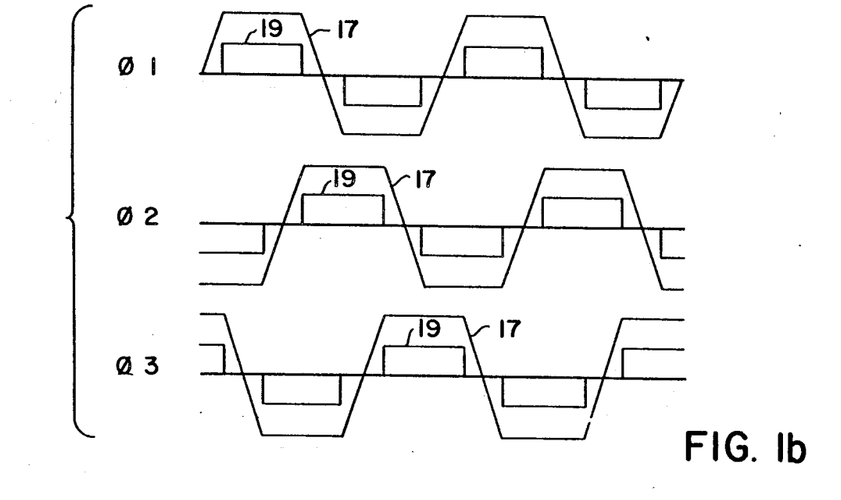

Applicants have developed an injection molding machine drive system using another type of brushless servomotor—the brushless DC motor. In a brushless DC motor, the stator is comprised of a number of windings in each of three phases equal to the number of magnets on a permanent magnet rotor. The magnets mounted on the rotor are generally common ceramic magnets. The geometry of the stator windings and the permanent magnet geometry on the rotor produce a distribution of flux density on the rotor such that a trapezoidal EMF waveform 17 as show in FIG. 1b is induced in the stator windings when the rotor is turned at a constant speed. The cummulative effect of the trapezoidal EMF in each phase is to produce an approximately flat waveform for the induced current in the stator. Constant torque is produced when rectangular current block signals 19 as shown in FIG. 1b are applied to the stator windings. It should be noted that the blocks of current are discontinuously applied for durations of 120 degrees as opposed to the continuous application of sinusoidal current over 180 degrees in an AC servomotor as show in FIG. 1a. The commutation of this discontinuous current from one winding to another is the primary cause of the cogging characteristic in brushless DC motors.

The amplitude of the EMF is proportional with the speed; therefore, speed is controlled by controlling the voltage amplitude of the signal applied to the stator windings The amplitude of the current blocks in the stator is linearly proportional to and controls the generated torque. For uniform torque generation, regardless of the rotor position, current commutation has to occur at predetermined rotor angles. These angles are usually detected by three Hall effect sensors which are mounted on the stator and provide feedback information to the motor control to control the switching of the motor stator currents. In addition, an inexpensive low resolution tachometer may be used to provide a rotor velocity signal.

Through the commutation logic, the current-torque and voltage-speed characteristics of the brushless DC motor become substantially similar to those of the brush-type DC motor. Consequently the regulation circuit for a brushless DC motor is quite simple, and it can be configured to emulate the control characteristics of the brush-type DC motor drive.

Figure 2:
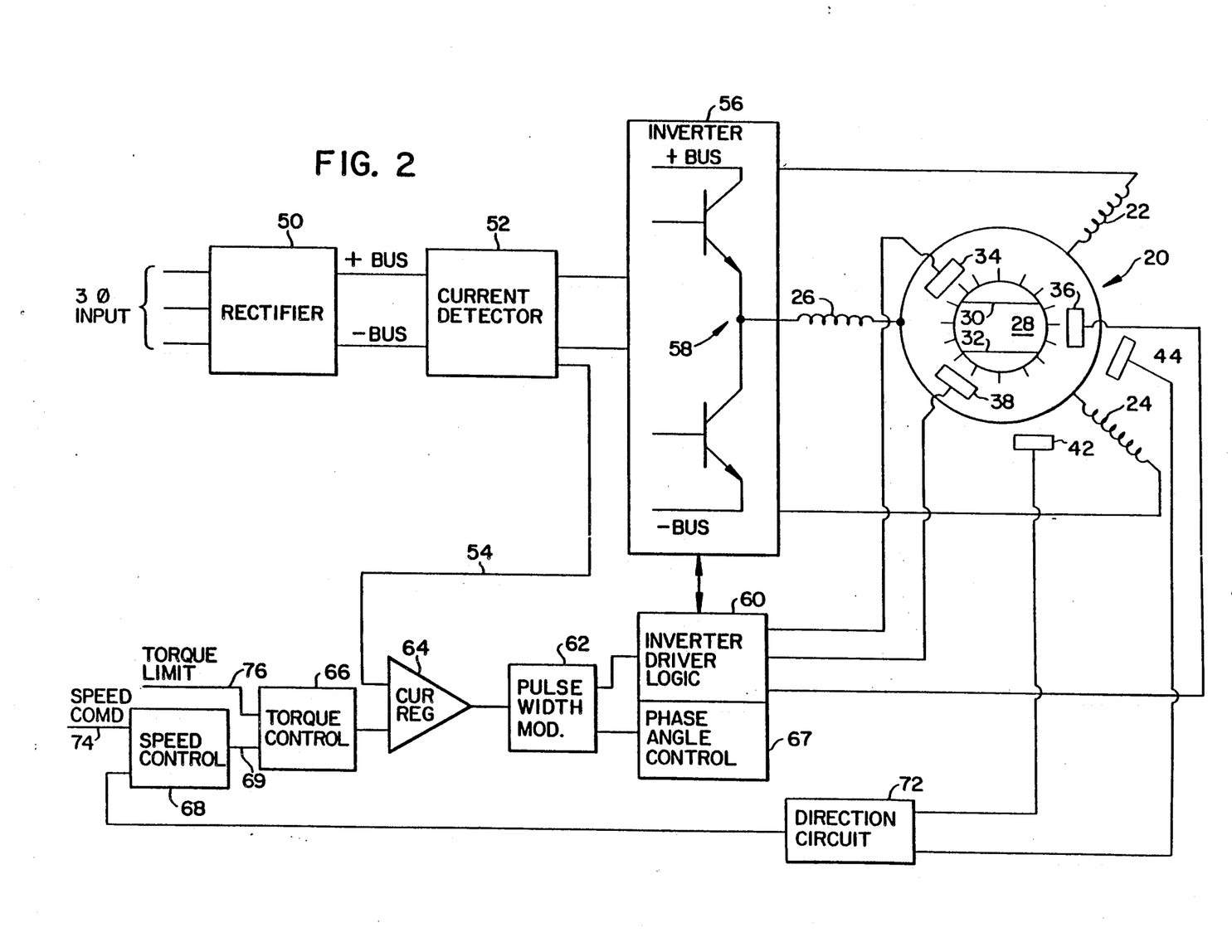
FIG. 2 is a block diagram illustrating the control circuit components typically used with a brushless DC motor.

FIG. 2 is a block diagram illustrating the basic elements of a typical brushless DC motor control. The motor is shown at 20 as a single pole motor having three stator coils 22,24, and 26 wired in a wye configuration which are wound on a cylindrical stator housing (not shown). The coils may also be connected in a delta configuration depending on the desired motor performance. A rotor 28 is rotatably mounted within the stator housing and contains a set of magnets 30 and 32 mounted diametrically on the circumference to provide two different magnetic poles. Three Hall effect sensors 34,36, and 38 are mounted on the stator housing and produce rotor position feedback signals each time a magnetic pole of the rotor passes the sensor.

To obtain a trapezoidal EMF waveform versus time as shown in FIG. 1b, the design of a brushless DC motor must take into consideration the stator winding geometry, the geometry, size and spacing of the rotor magnets and the air gap between the rotor and stator. The Hall effect sensors 32,34, and 36 are precisely positioned on the stator housing to provide rotor position feedback signals to permit switching the current signals to the stator windings at exactly the right time relative to the induced trapezoidal EMF wave form. Therefore the switching or commutation of the current to maintain the ideal space quadrature of the magnetic fields is inherent in the motor construction and does not have to be separately controlled.

Although a single pole motor is illustrated, more typically 4, 6, or 8 pole motors are used. That means there will be a number of sets of windings in each of the three phases equal to the number of poles, and the rotor will also contain a number of magnets equal to the number of motor poles. However, the same three Hall effect sensors are used regardless of the number of poles in the motor. Thus, the Hall effect sensors have the advantage of being low cost position detectors which are effective to provide the required rotor position feedback signal.

The motor of FIG. 2 also provides other feedback capabilities which are accomplished by Hall effect sensors 42 and 44 mounted on the stator housing that operate in conjunction with magnetic rotor markers 40 which define equal increments of the rotor circumference. Each of the Hall effect sensors 42 and 44 will produce an output signal each time a magnetic rotor marker passes it. Hence, the Hall effect sensors 42 and 44 and rotor markers 40 provide a low cost feedback device having a resolution in the range of 100–300 pulses per revolution. The output signals from the sensors 42 and 44 are used to determine the angular velocity and direction of rotation of the motor.

A rectifier 50 is responsive to a 3-phase input signal to produce fixed positive and negative DC voltages on the positive bus and negative bus, respectively. A current detector 52 functions to detect the total current flowing through the motor stator windings 22,24, and 26 and provides a current feedback signal on an output line 54. An inverter 56 is comprised of a power transistor bridge for switching each of the stator phases from an open circuit condition to the positive or negative bus. A typical transistor bridge 58 for one stator winding is illustrated. The duty cycle of each transistor bridge is controlled by the inverter driver logic 60 in response to the rotor position feedback signals from the Hall effect sensors 34,36, and 38. The inverter driver logic 60 is also controlled by a pulse width modulator 62. The current regulator 64 provides a command signal to the pulse width modulator in response to signals from the torque control 66 or the speed control 68.

As mentioned earlier, it is generally desirable to control motor speed and torque. The speed control 68 is responsive to a desired speed command signal on input 74 and compares that desired speed signal to an angular velocity feedback signal from a direction sensor 72 to produce a velocity error signal on line 69. The velocity error signal is an analogue signal representing the difference between the desired or set speed and the actual angular velocity of the motor. The torque control 66 is typically not used on a brushless DC motor, and it will be ignored in the initial discussion of the motor control operation. Therefore, the velocity error signal on line 69 is effectively fed directly into the current regulator 64, which is also connected to the current feedback signal on output line 54 from the current detector 52. The current regulator 64 produces an output to the pulse width modulator 62, representing the sum of the current feedback signal and the velocity error signal. As the pulse width modulator increases the voltage to the motor, the angular velocity will increase and more current will be used by the motor. Over a period of time, the velocity error signal will be reduced to zero, and the increased current feedback signal will cause the current regulator and the pulse width modulator to maintain the desired applied voltage and motor speed.

As earlier discussed to obtain the desired speed and torque values, it is necessary to control the applied voltage and current flow, respectively, in the stator coils The power transistor bridge 58 only has the capability of switching between fixed positive and negative DC voltages. Therefore, the control utilizes a known technique of pulse width modulation to obtain the desired voltage and current values. The duty cycle of the transistor bridge is controlled by the rotor position feedback signals from the Hall effect sensors 34, 36, and 38. During the on-time of a transistor in the bridge the pulse width modulator provides a number of on-off signals to the inverter driver logic 60 so that the power transistor switches on and off during the duty cycle on-time. The net result is that even though the transistor is switching to the fixed positive or negative voltages; over the period of the duty cycle on-time, the average voltage during that period will be less. Likewise, the average current will be determined by the average of current flows during the bridge transistor on-times over the period of the duty cycle on-time Therefore, through pulse width modulation, the desired applied voltage and current flow to the stator coils can be obtained. The net result is the application of blocks of current 19 in each phase as shown in FIG. 1(b) which produce a total motor current having a magnitude defined by the output of the current regulator.

Although torque control is not typically used, a brushless DC motor may be commanded under torque control. In that situation, a torque control 66 responds both to a torque limit signal on input 76 and to the velocity error signal on line 69 and limits the velocity error signal to the torque limit signal. More specifically under normal operation, when speed and torque are set, assuming the velocity error signal on line 69 does not exceed the set torque signal on line 76, the motor control will bring the motor up to the set speed. As the load on the motor increases, the speed will start to reduce and the speed error signal will increase. The current regulator will supply more current to bring the motor back to the commanded velocity. As the load continues to increase, the speed error signal will reach the limit established by the torque limit signal on input 76. At that point, the motor is under torque control. The current regulator 64 will then control the pulse width modulator to establish a current and torque in the motor corresponding to the torque limit. The torque limit signal may be varied, and current flow and motor torque changed in accordance therewith. When the torque control is not being used, the set torque signal is set to its maximum value.

The pulse width modulator controller may be controlled in response to the speed control or the torque control, or it may be allowed to respond to both velocity and torque error signals In that case, the controller will switch between the velocity and torque error signals to select one of them as a controlling variable depending on the state of those error signals and other motor conditions.

The overall block diagram for the control of an AC synchronous motor would be very similar to the block diagram of the control for a brushless DC motor as illustrated in FIG. 2. Although the individual block diagram control elements have similar functions, the specific circuit elements comprising the respective blocks would., however, be significantly different for the different motors. The AC servomotor generally draws more current and has more complicated current flow dynamics which require higher quality control circuit elements. The more significant differences are the following.

First, the ceramic magnets of the brushless DC motor would be replaced in an AC servomotor by rare earth magnets to increase flux and reduce rotor inertia for improved servomotor performance.

Second, the Hall effect sensors on the stator and the low resolution rotor encoder of the brushless DC motor would be replaced in the AC servomotor by a high resolution optical rotor encoder or a resolver so that a high resolution position absolute feedback signal would be obtained. The high resolution absolute position feedback signal is required because the AC servomotor control must generate precise current switching signals; and further, for each increment of rotor rotation, it must perform sine wave encoding of the current signals for each of the three phases.

Third, in order to achieve a sinusoidal current drive, the pulse width modulator and inverter driver logic of a brushless DC motor would be replaced in the AC servomotor by significantly more complicated commutation circuit. Such a circuit must first define the cross-over points of the sinusoidal currents for each phase in order to control motor speed. The cross-over points will define the duty cycle and switching of the inverter transistor bridge. Next, since a sinusoidal current wave form 15 as shown in FIG. 1a is required, the commutation circuitry must respond to each incremental angular position of the rotor and control the pulse width modulator such that the appropriate current magnitude for the sine wave form in each phase is produced. Therefore, in synchronization with each absolute rotational increment of the resolver, an increment of a sinusoidal current wave form is produced for each phase in the proper phase relationship to the other phases. Finally, the AC servomotor control must respond to the signal from the current regulator to produce the desired total current flow in the motor.

The above described control functions for an AC servomotor are significantly more complex and more difficult to implement than the simpler control functions required in a brushless DC motor, where commutation is fixed by and obtained from the Hall effect sensors. Further, the pulse width modulator in the brushless DC motor control does not have to continuously modulate the current signal magnitude within any one duty cycle. In contrast, it only modulates a single fixed amplitude throughout the duty cycle and the modulation is the same for all three phases.

Therefore, even though the overall control system block diagrams for a brushless DC motor and an AC servomotor are very similar, there are significant differences in circuit elements, operation and also in the processes being controlled. The result is that an AC servomotor control requires a significantly more complex control operation, more sophisticated circuit elements are required and the cost is significantly higher.

Figure 4:
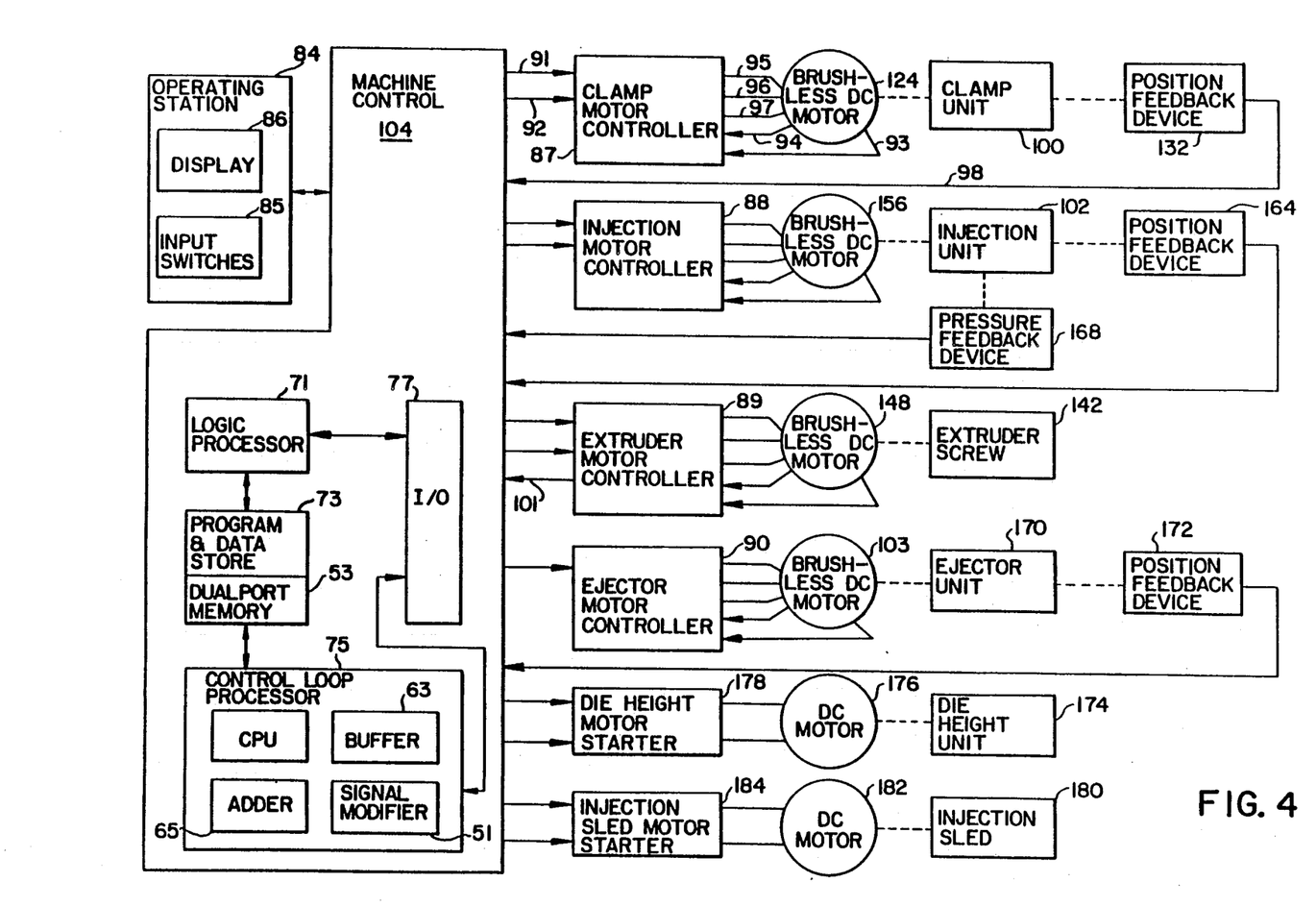
FIG. 4 is a schematic block diagram illustrating a control system including brushless DC motors for use on a typical injection molding machine.

FIG. 4 is a schematic block diagram illustrating the use of brushless DC motors as sources of motive power on a typical injection molding machine. A machine control 104 is connected to an operator station 84 which contains operator pushbuttons and input switches 85 and a display device 86. The display device 86 on the operator station may be limited to indicator lights or may be a color cathode ray tube or other panel display which can provide real time information as to the status of the injection molding cycle. The machine control 104 may be represented by any of the CAMAC series of injection molding machine controls manufactured and sold by Cincinnati Milacron Inc. which provide a closed-loop capability. The control 104 is basically comprised of a logic processor 71 and associated program and data store 73. The store 73 typically contains memory for storing the operating system program for the logic processor 71 and memory for storing a sequence of logic instructions to be executed by the logic processor for providing a cycle of operation of the injection molding machine. The logic instructions are generally preprogrammed and loaded into ROM memory in the store 73 The store 73 further contains memory for storing data associated with the desired cycle of operation. The data may represent desired position, velocity, temperature, pressure or other data which represents set points or limits required to operate the machine to produce an acceptable part. The operator may modify the set point data through the operator station 84.

In executing the logic instructions the logic processor 71 controls the real time functions of the machine by producing via the I/0 interface 77 velocity, torque and other set point command signals to the appropriate motor controllers and other machine devices to initiate a cycle of operation. The processor 71 receives position, velocity, pressure, temperature and other signals from the machine and operates with the control loop processor 75 to change the states of or terminate existing set point signals and/or produce new set point signals to the machine to continue the cycle of operation.

The store 73 also contains dual port memory 53 which is shared by the logic processor 71 and the control loop processor 75. One function of control loop processor is to close a servoloop in the control 104. For example, the control loop processor 75 may read a velocity command signal from the dual port memory and store it in the buffer 63. The buffered velocity command signal is provided to the controller 87 to command motion of the clamp unit, a position feedback signal on line 98 representing the position of the clamp unit is received through a I/0 interface 77. The control loop processor 75 algebraically sums in adder 65 the position feedback signal with a programmed position set point signal stored in the dual port memory portion of the store 73. When the resultant sum equal zero, i.e., the actual position of the clamp unit equals the programmed position, the control loop processor 75 terminates the existing velocity command signal to the controller 87 or provides a new velocity command signal to the buffer 63. Similarly, a pressure feedback signal may be received through I/0 interface 77 from a pressure transducer 168 on the machine which measures the pressure on an extruder screw in the injection unit 102. The analogue pressure feedback signal is converted to a corresponding digital signal which is algebraically summed or compared in adder 65 with a programmed pressure set point or limit signal stored in the dual port memory portion of the store 73. If the actual pressure exceeds the pressure limit, the error signal representing the pressure difference may be used by the signal modifier 51 to modify or reduce a velocity command signal in the buffer 63. The control loop processor may be embodied using either digital or analogue technologies. The machine control 104 has other components, capabilities, and functions but a discussion of those is not required for an understanding of the present invention.

At the appropriate times in the cycle, velocity and torque set point signals are produced to the motor controllers 87, 88, 89, and 90. Those controllers are identical in construction and operation to the controller described in FIG. 2. Briefly summarizing the operation of the clamp motor controller 87, a speed control within the motor controller responds to a velocity command signal on input 92 and a velocity feedback signal on line 93 from the brushless DC motor 124 to produce a velocity error signal Similarly, within the controller 87, a torque control is responsive to a torque limit signal on input 91 and a motor current feedback signal created within the controller 87 to produce a torque error signal. A pulse width modulator responds to either or both of the error signals as determined by the controller 87 to produce a modulated output signal to inverter drive logic. The inverter drive logic in controller 87 responds to a rotor position signal on line 94 produced by Hall effect sensors on the clamp motor 124 to control the switching of inverter power transistors thereby producing three-phase drive signals on lines 95, 96, and 97 connected to the stator coils of the motor 124.

The motor 124 is mechanically coupled to a clamp unit 100 and causes relative motion between the clamp members. A position feedback device 132 is connected to the clamp unit to produce a position feedback signal on line 98 representing the position of a movable clamp member. Further, the controller 87 may also produce a velocity feedback signal to the machine control 104 representing the angular velocity of the motor 124. Although velocity feedback signals may be produced by any or all of the controllers, it is illustrated in FIG. 4 as being produced by the extruder motor controller 89 on line 101. The operation of motor controllers 88, 89, and 90 and their respective servomotors 156, 148, and 103, are similar to the operation of the clamp motor controller 87 and brushless DC motor 124 just described. One additional signal which is utilized in controlling the injection unit during pressure profiling is a pressure feedback signal from pressure transducer 168 which is input into the machine control 104 and allows direct measurement of pressure.

Figure 5:
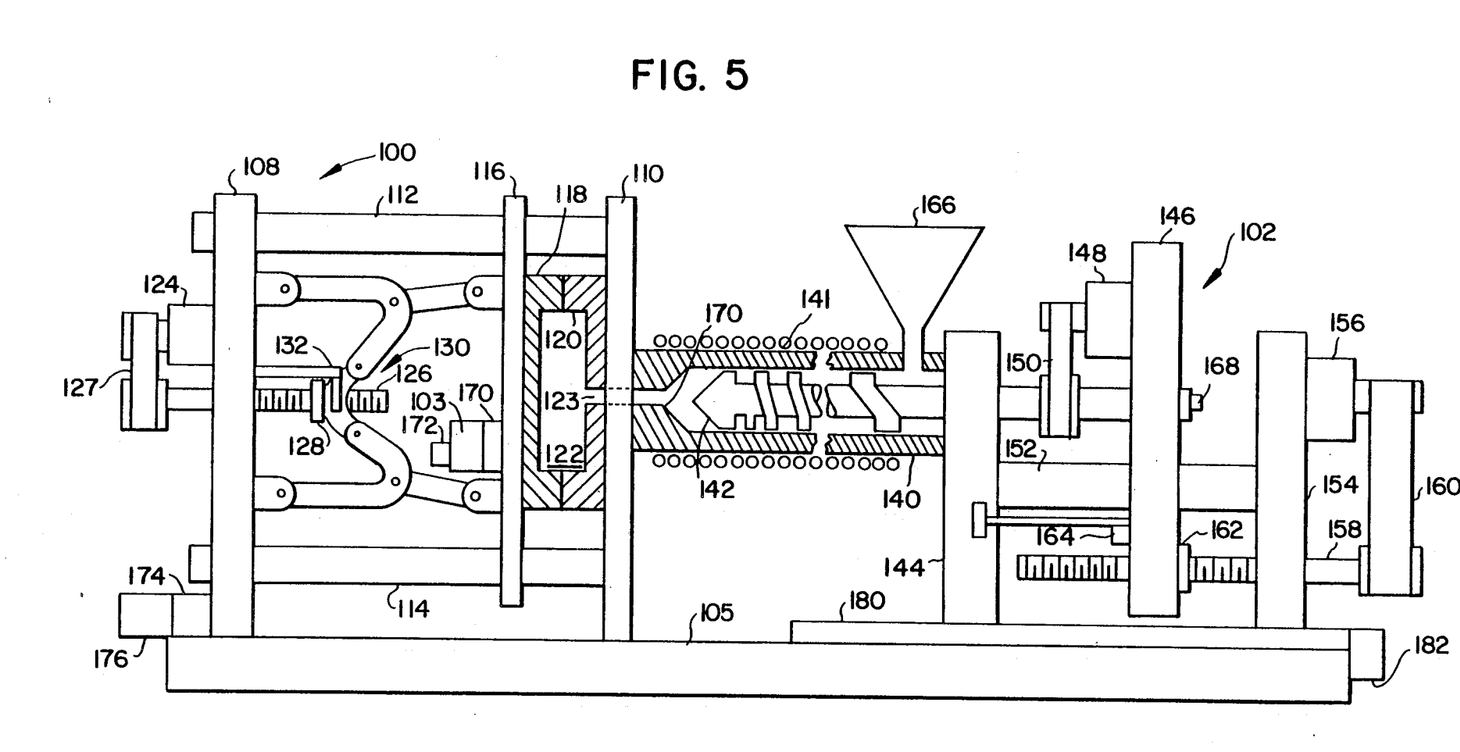
FIG. 5 illustrates the overall structural components for one type of injection molding machine to which brushless DC motors can be applied.

FIG. 5 illustrates an injection molding machine to which brushless DC motors are applied. The machine is comprised of a clamp unit 100 and an injection unit 102, each mounted on a base 105.

The clamp unit 100 is comprised of rectangular stationary platens 108 and 110 which are connected by four tie bars at the platen corners. Two tie bars 112 and 114 are shown. The tie bars operate as guides for a movable platen 116. Mold halves 118 and 120 are affixed to the platens 116 and 110, respectively; and when the clamp is in the closed position shown, a mold cavity 122 is formed between the mold halves. A gate opening 123 passes through mold half 120 and stationary platen 110 to permit the injection of a plastic melt into the mold cavity 122. The moving platen is operated by a brushless DC motor 124 mounted on the stationary platen 108. The motor is connected to a ball screw 126 by a belt coupling 127. A gear drive or other mechanical coupling may also be used. The ball screw nut 128 is mounted in a toggle mechanism 130 which provides a mechanical advantage for the motor 124 in operating the clamp unit. A position feedback device such as a linear potentiometer 132 provides a signal representing the position of the movable platen member 116 relative to the stationary platen 108.

The injection unit 102 includes an extruder mechanism comprised of a tubular barrel 140 with an extruder screw 142 rotationally and translationally mounted therein. The screw is journalled in the stationary member 144, and one end of the screw 142 is rotatably secured in the movable member 146. Rotational motion of the screw 142 is provided by the motor 148 mechanically connected to the screw by a belt coupling 150, which may also be implemented by any other suitable mechanical coupling. The movable member 146 rides on a pair of parallel bar guides one of which is shown at 152, connected between the stationary members 144 and 154. A brushless DC motor 156 mounted on the member 154 is connected to a ballscrew 158 by a belt coupling 160 or the like. The ball screw nut 162 is mounted in the movable member 146; and therefore, the motor 156 is operative to provide linear motion to the member 146 and the extruder screw 142 toward and away from the stationary platen 110. A position feedback signal representative of the position of the member 146 is obtained from a feedback device typically shown as a linear potentiometer 164.

Referring to FIGS. 4 and 5, there are several other motors typically used on an injection molding machine. The ejector unit 170 is integrated with the mold and is operative to eject the finished molded part as the mold opens. The ejector unit is coupled to a brushless DC motor 103 which is connected to a motor controller 90. The machine control 104 provides a velocity set point signal to the controller 90 at the appropriate time in the injection molding cycle and also in response to an ejector position feedback signal from the feedback device 172. The ejector unit is under servocontrol to accommodate the various requirements and operations of different molds.

A die height unit 174 is typically integrated into the tie bars and platen 108 shown in FIG. 5. The die height unit provides an adjustment of the spacing of platen 108, including toggle mechanism 130 and movable platen 116, relative to the stationary platen 110 to accommodate different molds having different mold thicknesses when the molds are in the closed position. The die height unit is controlled by a DC motor 176 which is connected to a motor starter 178. The die height adjustment is manually controlled by the operator which results in the machine control 104 producing forward or reverse command signals to the motor starter 178.

The injection sled 180 generally rides on tracks (not shown) on the base 105 and supports the entire injection unit 102, thereby permitting the injection unit to be moved toward and away from the stationary platen 110. The injection sled is mechanically coupled to a DC motor 182 which is connected to a motor starter 184. Again, the operation of this unit is manually controlled by the operator which results in the machine control 104 providing forward or reverse command signals to the motor starter 184.

Referring to FIGS. 4 and 5, a cycle of operation will briefly be described starting with the clamp unit 100 in the illustrated closed position. Also as illustrated solid thermoplastic, thermoset or other material from the hopper 166 will have been plasticized by the screw 142 to form a liquid phase plastic melt or shot in front of the screw. Plastication time can be reduced by providing external heat to the barrel 140 typically by a plurality of circumferentially mounted heater bands 141. To initiate an injection cycle, the machine control 104 provides a velocity command to the motor 156 in order to linearly move member 146 and screw 142 towards the platen 110. Several velocity command signals may be given by the machine control 104 to control the linear velocity of the screw 142 as a function of the position of the screw 142 relative to the platen 110, as detected by the position feedback device 164. As the screw 142 moves linearly in the barrel 140 toward the stationary platen 110, the plastic melt is injected through the orifice 170 and gate opening 123 into the mold cavity 122. The screw position defining the end of the linear motion of the screw 142 is then detected by position feedback device 164, and the machine control 104 transfers to the pack cycle. Alternatively, the machine control 104 may transfer to the pack cycle at the end of a predetermined period of time or when the pressure as measured by the pressure feedback device 168 exceeds a predetermined pressure limit. During the injection cycle in the subsequent pack and hold cycles, the extruder motor controller 89 is provided with a zero velocity signal and a maximum torque command signal. Those signals are necessary to keep the extruder screw from rotating in the presence of the linear forces exerted on the screw during the injection, pack, and hold cycles.

During the pack cycle, the machine control provides a velocity command signal and one or more torque command signals for predetermined periods of time. The object is to continue to push the material into the mold to complete the mold filling process. The motor controller 88 will provide current to the motor 156 in order to achieve the velocity command. However, based on the motor current feedback which is proportional to torque, the motor torque control will limit the current so that the commanded torque is not exceeded.

At the end of a predetermined period of time, marking the end of the pack cycle, the machine control 104 transfers to the hold cycle. Again, the machine control provides a predetermined velocity command signal and one or more torque command signals for predetermined periods of time which provide a torque limit profile during the hold cycle. After a predetermined period marking the end of the hold cycle the machine control 104 transfers to a cooling cycle during which there is no torque or velocity command signals for a further period of time while the molded part cools.

During the cooling cycle, the machine control 104 initiates an extruder run cycle in which the extruder motor 148 is run to extrude a new shot of molten material to the front of the screw 142. At the same time, the motor 156 must be operated to move the screw 142 away from the platen 110 while maintaining a predetermined pressure on the molten plastic material or a predetermined backpressure on the extruder screw 142. The machine control 104 provides a velocity command to the controller 89 to cause the extruder screw motor 148 to rotate the screw to plasticize more plastic material and carry it to the front of the screw adjacent to the orifice 170. At the same time, the machine control provides a zero velocity command and a torque limit command to the motor controller 88 to cause the motor 156 to refrain from rotation but to maintain a predetermined backpressure on the screw 142. As pressure builds up on the front of the screw, the controller 88 will have to supply more current to the motor 156 to maintain the zero velocity, i.e., to keep the motor from rotating. When the current detector in the motor controller senses a current representing a torque greater than the torque command, the torque control within the controller 88 overrides the velocity control, and the motor is allowed to rotate. The motor rotation will move the screw 142 away from the platen 110 and reduce the backpressure to the commanded torque limit. Consequently, as the screw 142 rotates to build a shot of molten plastic, the screw will be moved away from the platen 110 to maintain a predetermined backpressure on the screw.

The machine control 104 may provide one or more velocity commands to the controller 89 and one or more torque commands to the controller 88 as a function of the position of the extruder screw 142 as detected by the feedback device 164. When the screw 142 reaches a predetermined final position, the machine control stops the operation of the extruder motor 148 and issues a velocity command to the controller 88 to move the screw further to remove the pressure from the molten plastic material and the backpressure from the screw 142.

At the end of the molded part cooling cycle, the control 104 also provides a velocity command signal to the motor 124 to move the movable platen 116 in the direction away from the stationary platen 110 to open the mold. Different velocity command signals may be given to provide predetermined acceleration in deceleration of platen 116 depending on its position as detected by the position feedback device 132. While the mold is opening, the control will provide velocity command signals to an ejector unit 170 which includes an ejector motor 103 that accuates the mold part ejector mechanism (not shown) that can be carried by the mold half 118. The operation of the ejector motor 103 is controlled by a motor controller 90 that receives velocity command signals from machine control 104. The control 104 also receives an ejector position feedback signal from position feedback device 172 to control the position of the part ejector mechanism (not shown). The different velocity commands are provided as a function of the position of the ejector mechanism as detected by the position feedback unit 172. The finished part is ejected from the mold; and then, under control of velocity commands which are provided by the machine control 104 as a function of the position of the ejector mechanism as detected by the position feedback unit 172, the ejector motor returns the part ejector mechanism to its original position.

When a fully opened mold clamp position is detected, the control 104 gives velocity command signals to begin to moving the platen 116 in the opposite direction to again bring the mold halves together. The control 104 will generate several velocity commands depending on the position of the platen 116 to control acceleration and deceleration and bring the mold halves into controlled contact. For example, movable platen 116 may initially be moved at a rapid rate toward stationary platen 110 to reduce overall cycle time until a predetermined position is reached. Thereafter, a velocity command representing a low velocity is provided the controller 87 until another position is detected by the feedback device 132. The machine control 104 then provides a velocity command with a low valued torque command signal. Under normal circumstances, the mold halves will be brought together to the fully closed position as detected by the feedback device 132. However, if there is interference between the mold halves, the torque limit control will override the velocity control and reduce current to the motor to reduce motor velocity and motion to protect the mold halves from damage caused by the interference.

Assuming the mold halves reach the fully closed position, the torque command value is increased, and a velocity command is given to move the toggle a lockover position as shown in FIG. 5. The mold clamping force is determined and controlled by the final position of the toggle mechanism which is detected by the feedback device 132

While the embodiment heretofore described can operate an injection molding machine, there are several changes that may be made to improve machine performance. Brushless DC motors have the inherent disadvantage of motor cogging which is created by torque pulsations or ripples resulting from the commutation of discontinuous current blocks from one motor winding to another. The motor cogging is manifested by torque pulses or surges during motor operation which is more noticeable at lower speeds and can cause variations in finished part characteristics. Further, the motor will hunt or oscillate when it is not rotating but it is holding torque. That oscillation is primarily caused by the incremental velocity feedback used in the motor controller described in FIG. 2 and may result in wear on machine components.

Figure 7:
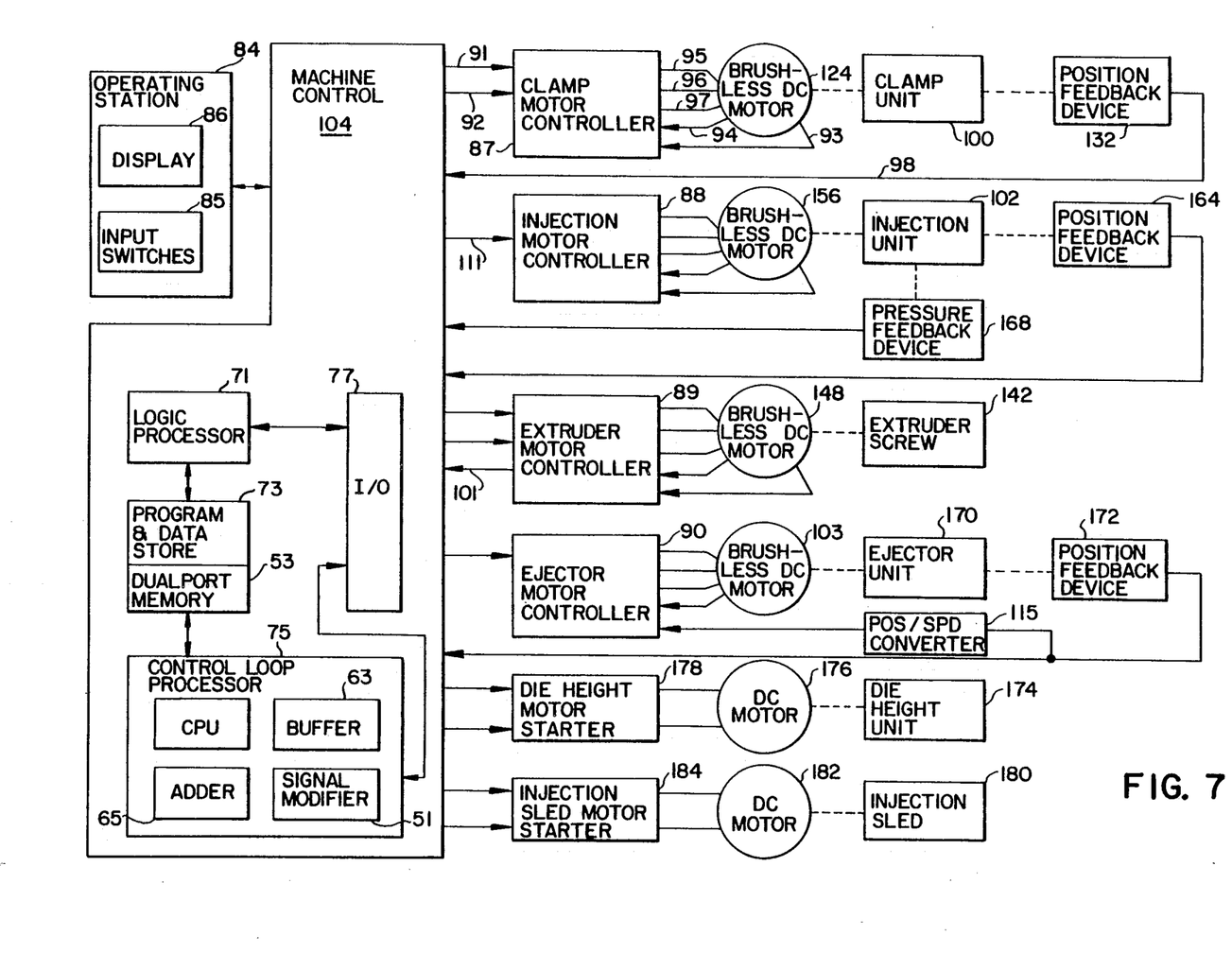
FIG. 7 is a schematic block diagram illustrating an alternative embodiment for a control system including brushless DC motors for use on a typical injection molding machine.

To minimize motor cogging, applicants have discovered that pressure or a variable representing a process or machine force may be controlled using the servomotor velocity loop. For example, the cogging of the injection motor causes periodically similar variations in pressure between the extruder screw and the molten material. Those pressure variations about a pressure set point may be used to inversely modify a velocity command signal such that when the pressure increases, the velocity command signal is decreased and vice versa. The result is that the pressure variations caused by motor cogging can be substantially reduced by using the servomotor velocity loop to control pressure. FIG. 7 illustrates that the torque control for the injection motor controller 88 is not used, but only the velocity control is used as represented by a velocity command on input 111. The pressure feedback signal is used by the control loop processor 75 to close a pressure loop within the control 104. The closed loop processor 75 compares a pressure feedback signal from the strain gage 168 with a programmed pressure set point or limit and produces an error signal representing the algebraic difference between the pressure limit and the pressure feedback signal. That error signal is used to modify a velocity command signal from the logic processor 71. Hence, the servomotor velocity loop within the the motor controllers is controlled by a pressure control loop within the control 104.

To reduce the zero velocity oscillation, the resolution of the motor feedback device is increased. The amplitude of the oscillation is a function of the resolution of the velocity feedback signal provided by the Hall effect sensors 42 and 44 illustrated in FIG. 2. A velocity feedback signal may also be obtained by differentiating a position feedback signals from a linear potentiometer contained on the machine. If the resultant velocity signal from the linear potentiometer has a resolution that is higher than the resolution of the velocity feedback signals from the Hall effect sensor, the amplitude of the zero velocity oscillation may be reduced by using, as a feedback to the speed control 68 of FIG. 2, a differentiated feedback signal from the linear potentiometers instead of the feedback signal obtained from the Hall effect sensors 42 and 44. An example of that is illustrated in FIG. 7 wherein the output of position feedback device 172 is differentiated by a position to speed converter 115, and the derivative of the position feedback signal is provided to the control 90 in place of a velocity feedback from the motor 103.

Figure 6:
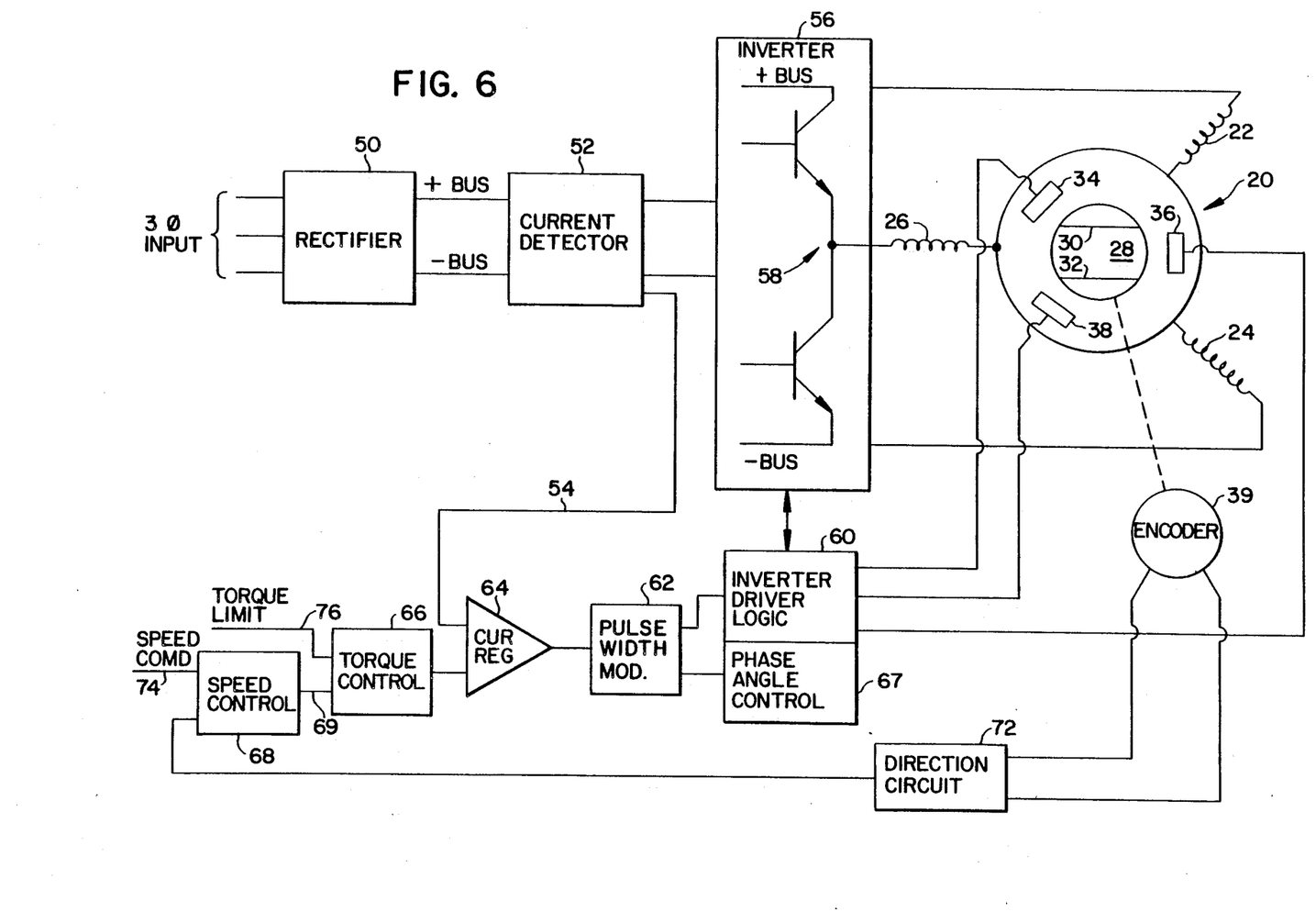
FIG. 6 is a block diagram illustrating an alternative embodiment for the control circuit components typically used with a brushless DC motor.

Alternatively, the Hall effect sensors 42 and 44 and their associated magnetic rotor markers 40 may also be replaced by a higher resolution incremental encoder 39 as shown in FIG. 6. The effect of a higher resolution encoder is to lessen the amplitude of the oscillation. However, as the oscillation amplitude decreases, the oscillation frequency increases proportionally with the encoder resolution and may be damped out by the machine components.

Referring to FIGS. 5 and 7, during the injection cycle, control loop processor 75 in the machine control 104 provides velocity command signals as a function of the position of the extruder screw 142. Further, the control loop processor 75 compares the programmed pressure limit with the actual pressure as represented by the pressure feedback signal. As long as the actual pressure remains equal to or less than the pressure limit, the machine remains under velocity control and the controller 88 will operate to move the extruder screw at a velocity equal to the velocity command signal. However, when the actual pressure exceeds the pressure limit, the control loop processor 75 switches to a pressure control mode in which the velocity command signal is reduced in proportional to the magnitude of the pressure error signal. The control loop processor will continue to control the magnitude of the velocity command signal until the actual pressure again is equal to or less than the pressure limit, at which point the motor controller 88 is again under the exclusive control of the velocity command signal. The injection cycle continues under velocity or pressure control as described above until an extruder screw position is reached which causes the machine control to transfer to the pack cycle.

As previously described, during the pack cycle, the machine control 104 provides one or more torque command signals over predetermined periods of time. Under the alternative embodiment, the servomotor torque control is not used. Instead, the control loop processor 75 provides a velocity command signal and one or more pressure set point signals over predetermined periods of time. The control loop processor functions as described relative to the injection cycle. The processor 75 provides the programmed velocity command as long as the actual pressure is equal to the pressure set point. However, if the actual pressure varies from the pressure set point, the control loop processor modifies the velocity command signal as a function of the pressure error signal.

After a predetermined period of time defining the pack cycle, the control 104 transfers to the hold cycle. The alternative embodiment also applies to the hold cycle. Instead of using torque control, the alternative embodiment controls the hold cycle by modifying the servomotor velocity control as a function of extruder screw pressure.

As previously described relative to FIGS. 4 and 5, the extruder run cycle requires that the extruder screw rotate to build up a quantity of plastic melt in front of the screw. At the same time, the motor 156 is provided a zero velocity signal with a torque limit command to maintain a predetermined back pressure on the screw. In the alternative embodiment, a velocity command is provided but the servomotor torque control is not used. Instead, as previously described, a pressure control loop is closed within the control 104 and used to modify the velocity command signal if the actual pressure on the extruder screw varies from the pressure set point.

By using the alternative embodiment of controlling the injection servomotor velocity loop as a function of extruder screw pressure as opposed to injection motor torque control, the motor cogging on an injection molding machine can be substantially reduced. Further, by utilizing a high resolution motor feedback device, the amplitude of zero velocity oscillation may also be reduced. The total effect is to reduce pressure fluctuations and substantially improve pressure control performance on an injection molding machine utilizing brushless DC motors.

Figure 3:
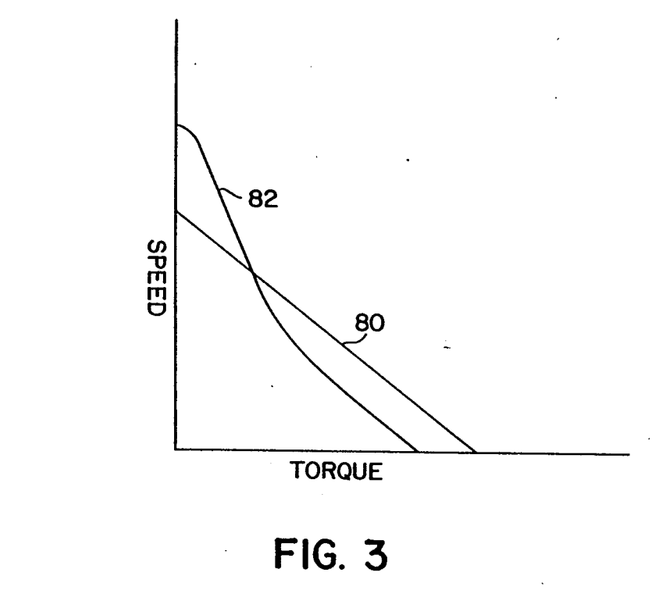
FIG. 3 illustrates the normal and phase angle advance speed-torque curves for a brushless DC motor

A brushless DC motor control has a further operating capability similar to that found in brush-type DC motors, that being, the ability to vary the shape of the speed-torque curve by controlling the commutation angle. The commutation angle is the angle between the applied voltage to the stator coils and the induced EMF. In the brushless DC motor, the EMF and the applied stator voltages are synchronous by virtue of the fact that the excitation is not an independent variable but is generated directly by rotor position information. Therefore, its relationship to EMF is a parameter controlled by the commutation electronics. Under normal operation, as shown in FIG. 1b, the applied block current signal 19 has a constant and fixed relationship with the induced trapezoidal EMF 17. The result is a speed-torque curve 80 shown in FIG. 3 wherein speeds greater than the maximum speed are available in the lower torque range, however, the maximum torque available at higher speeds is reduced below the maximum torque. By advancing the application of the block current signal, the speed-torque characteristic changes as shown by the curve 82 of FIG. 3. That characteristic is useful in tailoring the speed-torque characteristic of the brushless DC motor to the operation of an injection molding machine. For example, at the start of the close clamp motion, the process starts out with a very low torque during which maximum motor speed is desirable; and at the end of the cycle, motor speed decreases. Maximum motor speed is also desirable when the clamp opens. Under those situations a speed-torque characteristic shown by the curve 82 is ideal. It permits a higher no-load speed than typically is permitted by the linear speed-torque characteristic 80 under normal operation.

As previously described, in a brushless DC motor, in order to achieve maximum torque at a given speed, the ideal phase angle between the stator current and the magnetic vector of the rotor is maintained as close as possible to 90 degrees Higher speeds may be generated by modifying the commutation of the motor to reduce the phase angle. Referring to FIG. 2, under normal operating conditions, as the speed requirement increases, the pulse width modulator 62 increases the modulation of the voltage up to its maximum. When the maximum is reached, an output signal is produced to the phase angle control 67. The phase angle control then begins to reduce the commutation phase angle from its 90 degree optimum. The speed will increase by the cosine of the phase angle, and the torque will correspondingly decrease. Consequently, the brushless DC motor may be made to closely match the high traverse speed requirements of the clamp unit to reduce the overall machine cycle time.

The phase angle advance feature may also be applied to the extruder screw drive. Certain materials may have a very low viscosity and therefore, present a lower torque to the extruder screw and its motor. In those applications, phase angle advance may be used to increase the rotational velocity of the extruder screw and reduce the time required to plasticize a melt in front of the screw.

As previously mentioned. AC servomotors have been applied to injection molding machines, but their use results in several inherent disadvantages. First, AC servomotors have been designed for high servomechanism performance and have been typically applied to machine tools, robots, and other industrial equipment. The high servomechanism performance characteristics are desired because of the greater positioning accuracies required in those applications. That, in turn, leads to servomotor designs which minimize inertia, size, and consequently power. The complexity of the control and the cost of rare earth magnets adds significantly to the price of AC servomotors. Further, in high load applications where greater motor power is required, the two or more motors must be ganged together, which further increases cost. Moreover, the ganging together of AC servomotors adds additional problems in the mechanics and control and may adversely effect efficiency.

Brushless DC motors have typically been applied to general purpose power systems where velocity is the primary control parameter and torque is relatively constant or very predictable. Such applications include conveyors, elevators, winding machines, etc. where motor cogging is not a problem and high positioning accuracies are not required, and therefore, brushless DC motors have not heretofore been considered for machines requiring greater positioning accuracies and faster servo response. The general consensus of those designing machinery where motor cogging and servo performance are a consideration has been to ignore the brushless DC motor technology as not suitable and to select the generally accepted AC servomotor. Applicants have discovered that, surprisingly, brushless DC motors are particularly suitable for use on injection molding machines, that the problems of motor cogging and zero velocity oscillations can be overcome and positioning accuracies can be made sufficient to provide performance that is better than state-of-the-art hydraulically-actuated machines, and that they do so at a comparable cost. Further, the advantages of AC servomotors over hydraulic motors can be obtained at significantly less cost with brushless DC motors.

Returning to FIG. 5, a brushless DC motor is particularly useful as the clamp motor 124. As the size of the injection molding machine increases to a larger size to produce larger parts, e.g. 500 tons or more of clamping force, two or more AC servomotors are required to be ganged together in order to obtain the desired mold clamping forces. With a brushless DC motor, only a single motor is required to satisfactorily operate the clamp for a wider range of machine sizes, including machines of over 500 tons of clamping force.

Similarly, AC servomotors are being used for the injection unit motor 156 and the extruder motor 148. Again, the brushless DC motor can be controlled exclusively with the velocity control; and for larger machine sizes, only a single motor would be required as opposed to a plurality of AC servomotors.

Applicants have found that brushless DC motors in combination with a phase angle advance control may be used to improve the cycle time and extruder run time.

The application of brushless DC motors to injection molding machine servo systems has been ignored by others who have followed the traditional beliefs that AC servomotors are required to obtain satisfactory performance from sophisticated industrial equipment.

While the invention has been illustrated in some detail according to the preferred embodiments shown in the accompanying drawings, and while the preferred embodiments have been described in some detail, there is no intention to thus limit the invention to such detail. On contrary, it is intended to cover all modifications, alterations, and equivalents falling within the spirit and scope of the appended claims.

What is claimed is:

1. An injection molding machine for producing a molded part by injecting a molten material into mold elements having a mold cavity defining the molded part, the machine comprising:
   (a) clamp means for supporting the mold elements;
   (b) injection means for injecting the molten material into the mold cavity, said injection means including a screw member rotatably and translatably carried in a tubular barrel, said tubular barrel having an end in communication with the mold cavity;
   (c) first drive means mechanically coupled to the clamp means for imparting relative motion between the mold elements;
   (d) second drive means mechanically coupled to the injection means for rotating the screw member;
   (e) third drive means mechanically coupled to the injection means for translating the screw member within the tubular barrel;
   (f) wherein at least one of the first drive means, the second drive means and third drive means further includes
      (i) a brushless DC motor producing an electromotive force having an approximately trapezoidal waveform, said motor comprising a rotor having permanent magnets and stator windings surrounding said rotor, detecting means for detecting angular positions of the rotor, and
      (ii) motor controller means for controlling the brushless DC motor, said motor controller means connected to the brushless DC motor and responsive to a motor command signal, said motor controller means including
         (1) supplying means for supplying positive and negative DC signals,
         (2) switching circuit means for applying the positive and negative DC signals to the stator windings, said switching circuit means connected between the stator windings and the supplying means, and
         (3) control circuit means connected to the switching circuit means and the detecting means for activating the switching circuit means to selectively apply the positive and negative DC signals in a predetermined phase relationship to the stator windings to produce a commutation effect thereby creating a torque on the rotor to produce rotor rotation; and
   (g) machine control means connected to the motor controller means for producing the motor command signal.

2. The apparatus of claim 1 wherein at least another of the first drive means, the second drive means and the third drive means comprises:
   (a) a brushless DC motor producing an electromotive force having an approximately trapezoidal waveform, said motor comprising a rotor having permanent magnets and stator windings surrounding said rotor, detecting means for detecting angular positions of the rotor; and
   (b) motor controller means connected to the brushless DC motor for controlling the motor, said motor controller means including
      (i) supplying means for supplying positive and negative DC signals,
      (ii) switching circuit means for applying the positive and negative DC signals to the stator windings, said switching circuit means connected between the stator windings and the supplying means, and
      (iii) control circuit means connected to the switching circuit means and the detecting means for activating the switching circuit means to selectively apply the positive and negative DC signals in a predetermined phase relationship to the stator windings to produce a commutation effect thereby creating a torque on the rotor to produce rotor rotation.

3. The apparatus of claim 1 wherein each of the first drive means, the second drive means and the third drive means comprises:
(a) a brushless DC motor producing an electromotive force having an approximately trapezoidal waveform, said motor comprising a rotor having permanent magnets and stator windings surrounding said rotor, detecting means for detecting angular positions of the rotor; and
(b) motor controller means connected to the brushless DC motor for controlling the motor, said motor controller means including
  (i) supplying means for supplying positive and negative DC signals,
  (ii) switching circuit means for supplying the positive and negative DC signals to the stator windings, said switching circuit means connected between the stator windings and the supplying means, and
  (iii) control circuit means connected to the switching circuit means and the detecting means for activating the switching circuit means to selectively apply the positive and negative DC signals in a predetermined phase relationship to the stator windings to produce a commutation effect thereby creating torque on the rotor to produce rotor rotation.

4. The apparatus of claim 1 wherein the commutation effect creating a torque on the rotor produces periodic torque variations thereby causing deviations in a process variable in response to the torque variations, and wherein the machine control means further comprises means for controlling the process variable by modifying the motor command signal in response to the deviations in the process variable caused by the torque variations.

5. The apparatus of claim 1 wherein the commutation effect creating a torque on the rotor produces periodic torque variations thereby causing deviations in a process variable in response to the torque variations and wherein the machine control means further comprises:
(a) means for producing a process feedback signal representing the process variable changing in response to the torque variations;
(b) means for providing a set point signal representing a predetermined value of the process variable; and
(c) means responsive to the process feedback signal and the set point signal for modifying the motor command signal in response to changes in the process variable from the predetermined value thereby reducing the deviations in the process variable caused by the torque variations.

6. An injection molding machine for producing a molded part by injecting a molten material into a mold cavity defining the molded part, the machine comprising:
(a) injection means for injecting the molten material into the mold cavity, said injection means including a screw member rotatably and translatably carried in a tubular barrel, said tubular barrel having an end in communication with the mold cavity;
(b) first drive means mechanically coupled to the injection means for translating the screw member within the tubular barrel, said first drive means including
  (i) a brushless DC motor producing an electromotive force having an approximately trapezoidal waveform, said motor comprising a rotor having permanent magnets and stator windings surrounding the rotor, detecting means for detecting angular positions of the rotor, and
  (ii) motor controller means for controlling the brushless DC motor, said motor controller means connected to the brushless DC motor and responsive to a velocity command signal, said motor contoller means including
    (1) supplying means for supplying positive and negative DC signals,
    (2) switching circuit means for applying the positive and negative DC signals to the stator windings, said switching circuit means connected between the stator windings and the supplying means, and
    (3) control circuit means connected to the switching circuit means and the detecting means for activating the switching circuit means to selectively apply the positive and negative DC signals in a predetermined phase relationship to the stator windings to produce a commutation effect thereby creating a torque on the rotor with torque pulsations,
(c) means for producing a process feedback signal representing a nonvelocity variable changing in response to the torque pulsations; and
(d) machine control means connected to the motor controller means and the means for producing the process feedback signal for controlling the machine, said machine control means including
  (i) means for producing the velocity command signal representing a predetermined motor velocity,
  (ii) means for providing a set point signal representing a predetermined value of the nonvelocity variable,
  (iii) means responsive to the set point signal and the process feedback signal for generating an error signal representing the difference between the set point signal and the process feedback signal, and
  (iv) means responsive to the error signal for modifying the velocity command signal as a function of the error signal thereby reducing changes in the nonvelocity variable caused by the torque pulsations.

7. The apparatus of claim 6 wherein the means for producing a process feedback signal further comprises means for producing a pressure feedback signal representing pressure exerted against the screw member by the molten material.

8. An injection molding machine for producing a molded part by injecting a molten material into a two-part mold having a cavity defining the molded part, the machine comprising:
(a) injection means for injecting the molten material into the mold cavity, said injection means including a screw member rotatably and translatably carried in a tubular barrel, said tubular barrel having an end in communication with the mold cavity;
(b) first drive means mechanically coupled to the injection means for rotating the screw member to provide a quantity of molten material at one end of the screw member;

(c) second drive means mechanically couple to the injection means for translating the screw member within the tubular barrel, said second drive means including
  (i) a brushless DC motor producing an electromotive force having an approximately trapezoidal waveform, said motor comprising a rotor having permanent magnets and stator windings surrounding said rotor, detecting means for detecting angular positions of the rotor, and
  (ii) motor controller means for controlling the brushless DC motor, said motor controller means connected to the brushless DC motor and responsive to a velocity command signal, said motor controller means including
    (1) supplying means for supplying positive and negative DC signals,
    (2) switching circuit means for applying the positive and negative DC signals to the stator windings, said switching circuit means connected between the stator windings and the supplying means, and
    (3) control circuit means connected to the switching circuit means and the detecting means for activating the switching circuit means to selectively apply the positive and negative DC signals in a predetermined phase relationship to the stator windings to produce a commutation effect thereby creating a torque on the rotor with torque pulsations,
(d) means connected to the injection means for producing a pressure feedback signal representing a pressure exerted against the screw member by the molten material, said pressure feedback signal changing in response to the torque pulsations; and
p'(e) machine control means connected to the first and second drive means and the means for producing the pressure feedback signal for controlling the machine, said machine control means including
  (i) means for commanding the first drive means to rotate the screw member to provide a quantity of molten material at one end of the screw member,
  (ii) means for producing the velocity command signal for commanding the motor controller means to maintain the motor and screw member at a zero translational velocity,
  (iii) means for providing a pressure limit signal representing a desired pressure force between the screw member and the quantity of molter material,
  (iv) comparing means responsive to the pressure limit signal and the pressure feedback signal for comparing said signals, and
  (v) means responsive to the comparing means for modifying the velocity command signal thereby reducing changes in the pressure feedback signal caused by the torque pulsations.

9. An injection molding machine for producing a molded part by injecting a molten material into mold elements having a mold cavity defining the mold part, the machine comprising:
  (a) clamp means for supporting the mold elements;
  (b) injection means for injecting the molter material into the mold cavity, said injection means including a screw member rotatably and translatably carried in a tubular barrel, said tubular barrel having an end in communication with the mold cavity;
  (c) first drive means mechanically coupled to the clamp means for imparting relative motion between the mold elements;
  (d) second drive means mechanically coupled to the injection means for rotating the screw member;
  (e) third drive means mechanically coupled to the injection means for translating the screw member within the tubular barrel;
  (f) wherein at least one of the first drive means, the second drive means and the third drive means further includes
    (i) a brushless DC motor producing an electromotive force having an approximately trapezoidal waveform and further producing a maximum torque at a predetermined velocity, said motor comprising a rotor having a plurality of permanent magnets and stator windings surrounding said rotor, each of said magnets producing a corresponding magnetic vector, detecting means for detecting angular positions of the rotor, and
    (ii) motor controller means for controlling the brushless DC motor, said motor controller means connected to the brushless DC motor and responsive to a velocity command signal representing a velocity exceeding the predetermined velocity, said motor controller means including
      (1) supplying means for supplying positive and negative DC signals,
      (2) switching circuit means for applying the positive and negative DC signals to the stator windings, said switching circuit means connected between the stator windings and the supplying means,
      (3) control circuit means connected to the switching circuit means and the detecting means for activating the switching circuit means to selectively apply the positive and negative DC signals to the stator windings in a predetermined phase relationship with the magnetic vectors of the rotor to produce a commutation effect thereby creating a torque on the rotor to provide the maximum torque at the predetermined velocity, and
      (4) phase angle advance means for changing the phase relationship between the positive and negative DC signals and the magnetic vectors of the rotor to increase the motor velocity beyond the predetermined velocity in response to the motor achieving the predetermined velocity; and
  (d) machine control means connected to the motor controller means for producing the velocity command signal representing a velocity exceeding the predetermined velocity.

* * * * *